United States Patent
Gohs et al.

(10) Patent No.: US 10,916,995 B2
(45) Date of Patent: Feb. 9, 2021

(54) METHOD AND TWO-PART TOOL ARRANGEMENT FOR PRODUCING A STATOR FOR AN ELECTRICAL MACHINE

(71) Applicant: CONTINENTAL AUTOMOTIVE GMBH, Hannover (DE)

(72) Inventors: Axel Gohs, Berlin (DE); Christoph Radtke, Berlin (DE)

(73) Assignee: Vitesco Technologies GmbH, Hannover (DE)

( * ) Notice: Subject to any disclaimer, the term of this patent is extended or adjusted under 35 U.S.C. 154(b) by 306 days.

(21) Appl. No.: 15/924,537

(22) Filed: Mar. 19, 2018

(65) Prior Publication Data
US 2018/0212496 A1   Jul. 26, 2018

Related U.S. Application Data

(63) Continuation of application No. PCT/EP2016/070795, filed on Sep. 5, 2016.

(30) Foreign Application Priority Data

Sep. 18, 2015 (DE) .......................... 10 2015 217 922

(51) Int. Cl.
*H02K 15/08* (2006.01)
*H02K 15/04* (2006.01)
(Continued)

(52) U.S. Cl.
CPC ........... *H02K 15/0087* (2013.01); *H02K 1/16* (2013.01); *H02K 3/14* (2013.01); *H02K 15/024* (2013.01)

(58) Field of Classification Search
CPC ............... H02K 15/0428; H02K 15/04; H02K 15/0414; H02K 15/00; H02K 15/0087;
(Continued)

(56) References Cited

U.S. PATENT DOCUMENTS 3,641,648 A * 2/1972 Kalberman ....... H01L 21/67144
228/6.2
3,834,014 A * 9/1974 Burr ....................... H01R 43/08
29/598
(Continued)

FOREIGN PATENT DOCUMENTS

| CN | 103098355 A | 5/2013 |
| CN | 103314508 A | 9/2013 |

(Continued)

OTHER PUBLICATIONS

International Search Report and Written Opinion dated Dec. 8, 2016 from corresponding International Patent Application No. PCT/EP2016/070795.

(Continued)

*Primary Examiner* — Peter Dungba Vo
*Assistant Examiner* — Kaying Kue

(57) ABSTRACT

The disclosure relates to a method for producing a stator. Electrical conductor elements are arranged in slots of a laminated core of a two-layer winding. The conductor ends of the conductor elements are moved relative to one another on an end side of the sheet metal packet at one or both of the layers by a positioning process by axially plugging together a normal helix tool with the axial conductor ends of some of the conductor elements and subsequent relative rotation of the normal helix tool relative to the sheet metal packet, and by axially plugging together a selective skewing tool with the axial conductor ends of the remaining conductor elements, such that they have a provided relative end position with respect to each other for a connection of a part of the conductor ends with corresponding conductor ends of the other layer.

11 Claims, 11 Drawing Sheets

(51) Int. Cl.
*H02K 15/00* (2006.01)
*H02K 1/16* (2006.01)
*H02K 3/14* (2006.01)
*H02K 15/02* (2006.01)

(58) Field of Classification Search
CPC ............. H02K 15/024; H02K 15/0435; H02K 15/085; H02K 15/0031; H02K 3/14; H02K 1/16; Y10T 29/49009; Y10T 29/49071; Y10T 29/49073
USPC .................... 29/605, 592, 606, 596, 732–736
See application file for complete search history.

(56) References Cited

U.S. PATENT DOCUMENTS

| | | | | |
|---|---|---|---|---|
| 4,160,926 A | * | 7/1979 | Cope | H02K 3/345 174/110 N |
| 4,424,939 A | * | 1/1984 | Ohashi | H01F 41/08 242/434.8 |
| 4,449,293 A | * | 5/1984 | Itoh | H02K 15/0435 140/92.1 |
| 4,491,281 A | * | 1/1985 | Dosaka | H01F 41/08 242/434.8 |
| 5,118,153 A | * | 6/1992 | Allison | H05K 13/0447 294/131 |
| 5,778,512 A | * | 7/1998 | Ichikawa | H02K 15/0414 29/598 |
| 6,055,720 A | * | 5/2000 | Finn | H01F 41/082 242/118.4 |
| 6,192,574 B1 | * | 2/2001 | Wargren | H01F 41/06 279/3 |
| 6,425,175 B1 | * | 7/2002 | Sawada | H02K 15/0414 29/564.1 |
| 6,694,598 B2 | * | 2/2004 | Takahashi | H02K 15/0428 29/596 |
| 2003/0132679 A1 | * | 7/2003 | Kato | H02K 15/0037 310/179 |
| 2003/0167624 A1 | * | 9/2003 | Fortuna | H02K 15/0043 29/596 |
| 2003/0233748 A1 | * | 12/2003 | Gorohata | H02K 3/505 29/596 |
| 2004/0172805 A1 | * | 9/2004 | Tokizawa | H02K 15/0037 29/596 |
| 2005/0081365 A1 | * | 4/2005 | Gorohata | H02K 15/0428 29/596 |
| 2005/0214151 A1 | * | 9/2005 | Okaichi | F01C 21/0845 418/125 |
| 2008/0036318 A1 | * | 2/2008 | Lee | H02K 15/02 310/89 |
| 2010/0077599 A1 | * | 4/2010 | Tokizawa | H02K 15/0478 29/596 |
| 2011/0099797 A1 | * | 5/2011 | Mishina | H02K 15/067 29/596 |
| 2011/0273033 A1 | * | 11/2011 | Nagashima | H02K 15/022 310/44 |
| 2012/0017425 A1 | * | 1/2012 | Endo | H02K 15/14 29/596 |
| 2012/0200190 A1 | * | 8/2012 | Matsuoka | H02K 15/0087 310/179 |
| 2013/0214634 A1 | * | 8/2013 | Hasegawa | H02K 15/0435 310/194 |
| 2014/0132096 A1 | * | 5/2014 | Takeda | H02K 15/026 310/71 |
| 2014/0201979 A1 | * | 7/2014 | Yamaguchi | H02K 15/065 29/596 |
| 2014/0225465 A1 | * | 8/2014 | Goto | H02K 3/28 310/71 |
| 2015/0059164 A1 | * | 3/2015 | Onda | H02K 15/0087 29/596 |
| 2015/0180319 A1 | * | 6/2015 | Kimura | H02K 15/0087 29/596 |

FOREIGN PATENT DOCUMENTS

| | | |
|---|---|---|
| DE | 4031276 A1 | 4/1992 |
| EP | 2599194 A1 | 6/2013 |
| EP | 2661801 A1 | 11/2013 |
| EP | 2661801 B1 | 8/2014 |
| JP | 2006136082 A | 5/2006 |
| JP | 2012205344 A | 10/2012 |
| JP | 2013172575 A | 9/2013 |

OTHER PUBLICATIONS

German Office Action dated Aug. 25, 2016 for corresponding German Patent Application No. 10 2015 217 922.2.
Chinese Office Action dated Mar. 4, 2019 for corresponding Chinese Patent Application No. 201680046448.4.

* cited by examiner

METHOD AND TWO-PART TOOL ARRANGEMENT FOR PRODUCING A STATOR FOR AN ELECTRICAL MACHINE

CROSS-REFERENCE TO RELATED APPLICATIONS

This application claims the benefit of PCT Application PCT/EP2016/070795, filed Sep. 5, 2016, which claims priority to German Application DE 10 2015 217 922.2, filed Sep. 18, 2015. The disclosures of the above applications are incorporated herein by reference.

TECHNICAL FIELD

The disclosure relates to a method for producing a stator of an electrical machine and to a tool arrangement for carrying out the method.

BACKGROUND

For generating a magnetic rotary field, a stator of an electrical machine has a laminated core and electrical coils. The laminated core consists of layers of magnetically soft metal sheets that are electrically insulated from one another. Arranged in the laminated core are slots, in which in turn electrical conductor elements of the coils are respectively arranged.

The coils as a whole are referred to as a winding. In the case of the two-layer winding mentioned, two conductor elements, for example two wires, are respectively arranged for each slot. The conductor elements lying radially on the outside in the slots form an outer ring or an outer layer of the two-layer winding. The conductor elements lying radially on the inside form the radially inner layer. The conductor pieces of the conductor elements of one layer that protrude out of the end face of a laminated core are crossed or transposed in the circumferential direction with the conductor pieces of the conductor elements of the other layer that protrude out of the end face. By subsequently electrically connecting conductor ends of one layer to a corresponding conductor end of the other layer, the individual conductor elements can be electrically interconnected with one another and in this way the electrical coils can be formed.

In order also to obtain electrical terminal ends for the electrical coils and also a number of loops or turns per coil, it is necessary to choose the transposition irregularly for example, selective conductor ends, so that in this way on the one hand free-standing coil terminals and on the other hand an interturn transition from one turn of the coil to the next turn are obtained. As a result of such interconnecting regions, the pattern of the transposition along the circumference has an irregularity, which entails the problem that in automated machine-production of a stator the conductor ends have to be laboriously positioned relatively in relation to one another. This is laborious because all of the conductor pieces protruding out of the end face of the laminated core have to be bent once again for the transposition.

Known solutions foresee pre-bending the conductor elements before they are arranged in the slots. However, this necessitates tolerances that result in an unfavorable or less-than-optimum axial end winding height of the end winding.

SUMMARY

The disclosure relates to a method for producing a stator of an electrical machine and to a tool arrangement for carrying out the method. The stator has a two-layer winding, which for each slot of a laminated core respectively has an electrical conductor element for a radially outer layer and an electrical conductor element for a radially inner layer of the two-layer winding. Each conductor element may respectively be for example an insulated wire. Finally, the disclosure also includes the finished stator.

The disclosure provides a stator that has a two-layer winding and a compact end winding.

The disclosure provides a method for producing a stator. For a radially outer layer and a radially inner layer of a two-layer winding, an electrical conductor element for each layer is respectively arranged in a known way in slots of a laminated core. Each conductor element may be for example an insulated wire or an insulated copper bar. It is therefore a bar winding. It is also possible for two conductor elements to be respectively provided by a wire in the form of a U, which is also referred to as the hairpin technique.

Each of the layers, that is to say each ring of conductor elements, can then be processed separately. In the case of one or both of the layers, according to the method, at an end face of the laminated core the conductor ends of all the conductor elements of the layer altogether are moved relatively in relation to one another respectively in a positioning process in a normal region by axially fitting together a normal skewing tool with axial conductor ends of the conductor elements of the normal region, and subsequent relative turning of the normal skewing tool with respect to the laminated core, and also furthermore in a connecting region by axially fitting together a selective skewing tool with axial conductor ends of the conductor elements of the connecting region. By the relative movement, the conductor ends are arranged in relation to one another in such a way that they are already in a relative end position in relation to one another that is intended for an interconnection of some of the conductor ends with corresponding conductor ends of the other layer. In other words, by the positioning process, the conductor ends are already brought into their end position that they must have for the interconnection with conductor ends of the other layer. The normal skewing tool and the selective skewing tool are provided for this purpose. By means of these two skewing tools, it is possible to position those selective conductor ends that are necessary in the interconnecting region for the forming of the coil terminals and the interconnecting of a number of turns of a coil independently of the conductor ends of the normal region.

After the positioning process, the conductor ends are inserted in the two tools, that is to say the normal skewing tool and the selective skewing tool, and are thereby already in their relative end position in relation to one another. Therefore, the end winding can subsequently be formed by the pins or conductor pieces of the conductor elements that project from the laminated core being transposed, without the relative end position changing as this happens. The conductor ends are kept in their relative end position in relation to one another by the two tools. This allows a compact end winding to form, without the conductor ends having to be newly positioned thereafter. The tools may be of a multi-part design.

In some implementations, in order to position the conductor ends favorably, it is provided that in the positioning process the conductor ends moved by the normal skewing tool are moved in the circumferential direction by a predetermined first turning angle and the conductor ends moved by the selective skewing tool are moved in the circumferential direction by a respective turning angle that is smaller than the first turning angle. This relative arrangement of the selective conductor ends is referred to as negative twist, which is advantageous for the interconnection of the turns.

In some implementations, in the positioning process the relative position of the terminal ends for the coils on the one hand and the conductor ends for the interturn transitions of the coils on the other hand is also set by the selective skewing tool. Here, the selective skewing tool has a number of receiving regions or pockets for respectively receiving a conductor end of one of the conductor elements of the interconnecting region. When fitting together the selective skewing tool with the conductor ends of the conductor elements of the interconnecting region, a pocket wall of one or some of the pockets (but not all of the pockets), that is arranged sloping with respect to a direction of insertion, moves the moved-in conductor end in the circumferential direction, so that the conductor ends of the conductor elements of the interconnecting region are moved relatively in relation to one another. Therefore, when fitting on or fitting together the selective skewing tool with the conductor ends, the sloping pocket wall brings about an additional movement of the conductor end along the circumferential direction. As a result, these conductor ends (for the coil terminal and the interturn transitions) are moved toward one another. This produces a spatial offset in the circumferential direction, by which the conductor ends for the interturn transitions are then respectively brought together with a conductor end of the other layer that does not belong to the same turn but to the next turn of the coil.

In some examples, at the same time the end winding is also formed, that is to say the skewing of the conductor pieces is performed, by the two tools, that is to say the normal skewing tool and the selective skewing tool. In this case, after the arranging of the conductor elements in the slots, i.e., at the beginning of the positioning process, a part of each conductor element of the layer protrudes axially out of the end face as a straight conductor piece. After the positioning process, i.e., when the conductor ends are in their relative end position in relation to one another, all of these straight conductor pieces are then jointly bent altogether in a twisting process by relatively turning and at the same time axially bringing together the two tools on the one hand and the laminated core on the other hand, so that a thereby formed respective skewing region of all the conductor pieces has the same skewing angle with respect to the end face. This produces a compact arrangement of the skewing regions in the end winding.

In some example, both layers of the two-layer winding are processed in the way described. In some implementations, in the twisting process, the conductor pieces of the outer layer are bent in one circumferential direction and the conductor pieces of the inner layer are bent in an opposite circumferential direction, so that the conductor pieces of the two layers are arranged crossed or transposed in relation to one another. Carrying out the positioning process and the twisting process for each layer means that the conductor pieces are already in their final form at the end face of the laminated core and can be electrically connected to one another for example by soldering or welding to form coils.

In order that each individual turn of the coils can itself also be formed directly after the twisting process by electrically connecting conductor ends, in some examples, by the twisting process, the conductor ends of one of the layers that are moved by the normal skewing tool are respectively arranged radially in line with corresponding conductor ends of the other layer.

By contrast, in some examples, after the twisting process, only some of the conductor ends of one of the layers that are moved by the selective skewing tool are arranged radially in line with corresponding conductor ends of the other layer and, in addition, for each intended electrical coil, a conductor end is respectively arranged between two adjacent conductor ends of the other layer. As a result, in each layer there is for each coil an exposed conductor end, which is indeed not arranged radially in line with another conductor end. This free conductor end then advantageously forms a coil terminal, which is easily accessible.

In some implementations, the conductor pieces of the conductor ends that project freely out of the laminated core are not simply bent or skewed, but are cranked. As such, in the positioning process all of the conductor ends are respectively arranged in a receiving region or a pocket of the respective tool. The receiving region or pocket should be understood as meaning a hole, for example a blind hole, in a body of the respective tool, that is to say of the normal skewing tool or of the selective skewing tool. By the twisting process, each protruding conductor piece of the conductor elements is cranked between the skewing region and the conductor end, so that the conductor end continues to be axially aligned or remains aligned axially parallel to the stator axis or rotational axis. This provides the advantage that the conductor ends of the two layers can be easily interconnected with one another.

In some examples, in order also to simplify the first method step, to be specific the arranging of the conductor elements in the slots, the conductor elements are provided as straight bars or as U-shaped wires, for example as straight wires. For respectively arranging them in one of the slots, the conductor elements are inserted into an axial end of the slot and are pushed into the slot in the axial direction. This provides the advantage that identically formed, straight bars can be used as conductor elements for producing the stator. Therefore, no further pre-forming of the conductor elements is necessary, but instead all of the forming steps are carried out by the positioning process and the twisting process. A further advantage is that a slot width of the slots in the circumferential direction can be less than a dimension of the conductor elements along the circumferential direction. In other words, the conductor elements can be inserted lengthwise into the slot from one end face.

The disclosure also includes a tool arrangement for producing the stator. The tool arrangement is suitable for carrying out an example of the method according to the disclosure. The tool arrangement has a normal skewing tool with respective receiving regions or pockets for inserting a conductor end of a conductor element. The normal skewing tool may be of single-part or multi-part design. Also provided is a selective skewing tool with respective receiving regions or pockets for respectively inserting a conductor end of a conductor element. The selective tool may also be of a single-part or multi-part design. The normal skewing tool and the selective skewing tool are intended for the cold forming of conductor elements of a radially outer layer and/or of a radially inner layer of a two-layer winding for a stator. Also provided in the case of the tool arrangement is a holding device for holding a laminated core of the stator. The laminated core may be arranged by the holding device in such a way that an end face of the laminated core is facing the normal skewing tool and the selective skewing tool. Furthermore, a movement device is provided, designed for the purpose that, with a laminated core arranged in the holding device and loaded with conductor elements, a conductor end of one of the conductor elements is respectively to be arranged in one of the pockets in each case in a positioning process and for this purpose first the normal skewing tool is to be moved along the axial direction of the stator up to the end face of the laminated core, and then turned in the circumferential direction with respect to the end face, and then the selective skewing tool is to be moved along the axial direction up to the end face. In this way, the conductor ends of all the conductor elements are then brought in the way described into a predetermined relative end position in relation to one another, which they also have in the finished stator.

In some implementations, in the case of the selective skewing tool, some of the pockets have a pocket wall arranged sloping with respect to the axial direction, by which, during the fitting together of the selective skewing tool on the one hand and the conductor ends to be arranged therein on the other hand, there is formed in each case a sliding surface for the respective conductor end entering the pocket, which pushes away the conductor end in the circumferential direction or subjects it to a bending force. As a result, a relative position of the conductor ends within the selective skewing tool is predetermined in the same working step.

In some implementations, the movement device is designed for the purpose that, after the positioning process, the normal skewing tool and the selective skewing tool on the one hand and the laminated core on the other hand are to be brought together in a twisting process and, during that, the normal skewing tool and the selective skewing tool are to be turned jointly (i.e. by the same turning angle) in relation to the laminated core, so that the conductor elements are uniformly bent by the same skewing angle with respect to the end face. As a result, those conductor pieces of the conductor elements that project or protrude out of the end face can be arranged close together.

Finally, the disclosure also includes the finished stator for an electrical machine that has been produced by the method according to the disclosure and/or by a tool arrangement according to the disclosure.

In the case of the stator according to the disclosure, in some examples, radially inner slot openings of the slots have in the circumferential direction a gap width or slot width which is less than a dimension of the conductor elements that are respectively arranged in the slots. The dimension is in this case measured in the same circumferential direction as the slot width. In other words, the conductor elements cannot be removed from the slot along the radial direction, but can only be inserted by way of one of the end faces. Such a small slot width, with at the same time transposed conductor elements in the end winding, is only possible by means of the method according to the disclosure and/or the tool arrangement according to the disclosure.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The described components of the below description each represent individual features of the disclosure which are to be considered independently of one another and which each also develop the disclosure independently of one another and can therefore also be considered to be a component of the disclosure, either individually or in a combination other than that shown. Furthermore, further features of the disclosure which have already been described can also be added to the below description.

In the figures, functionally identical elements are respectively provided with the same reference symbols.

Figure 1:
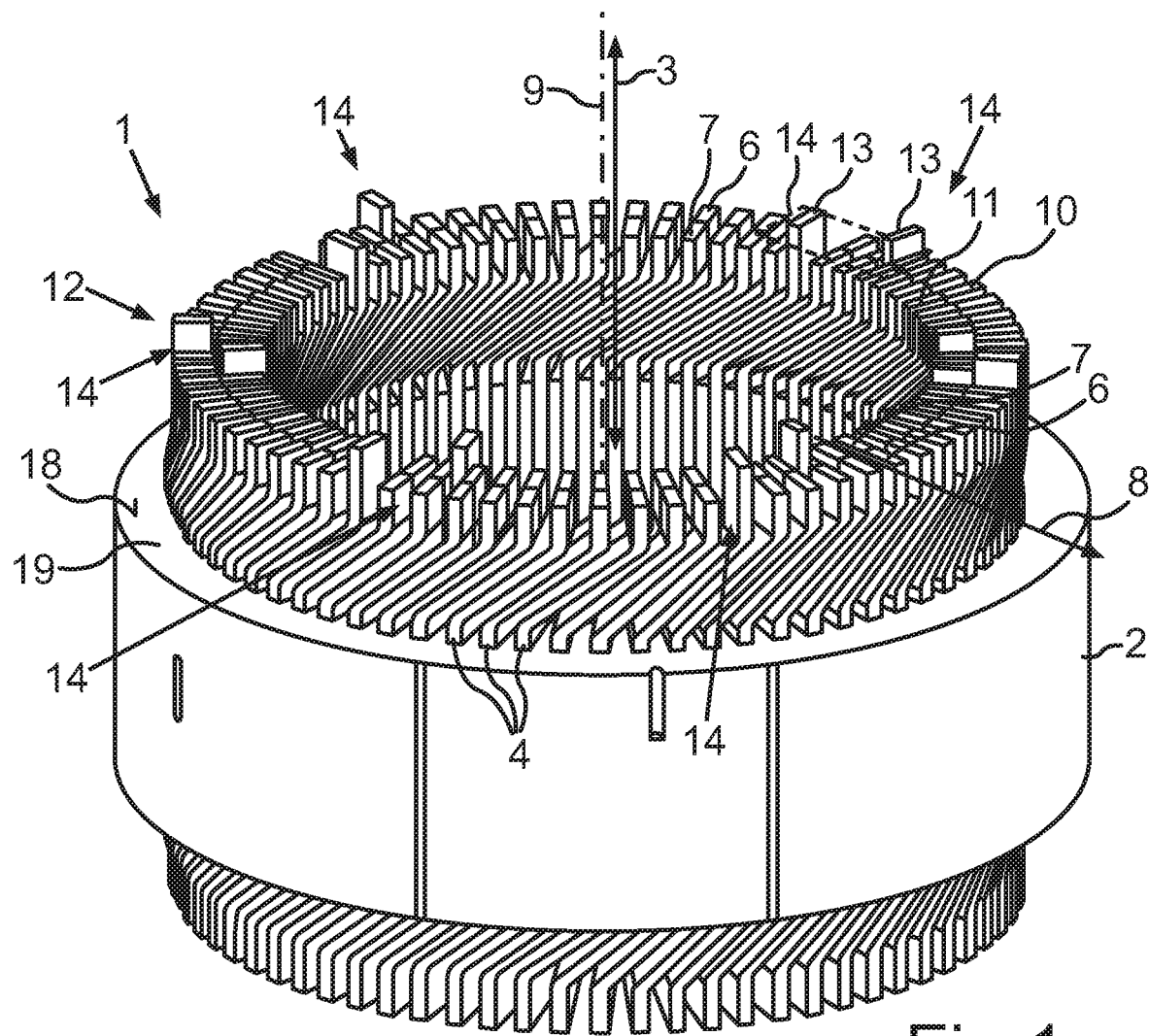
FIG. 1 shows a schematic representation of a perspective view of an exemplary stator.

FIG. 1 shows a stator 1 for an electrical machine. The stator 1 may be provided, for example, for a starter generator of a motor vehicle. The stator 1 has a laminated core 2, which can be formed in a manner known per se by layers of magnetically soft metal sheets (coercive field strength lower than 1000 A/m), which are electrically insulated from one another and are stacked or layered along an axial direction 3.

In slots 4 of the laminated core 2, in each case two conductor elements 6, 7 have been inserted through an axial slot opening 5. For the sake of clarity, in each case only some of the specified elements have been provided with a reference symbol. The conductor elements 6, 7 of each slot 4 are arranged in line one behind the other in a radial direction 8. The radial direction 8 is directed perpendicularly outward from an axis 9 by which the axial direction 3 is defined. The axis 9 corresponds to the intended rotational axis of a rotor which can be arranged in the stator 1.

The different radial spacings of the conductor elements 6, 7 result in two rings or layers 10, 11, where the radially outer conductor elements 6, the layer 10 and the radially inner conductor elements 7 form the layer 11. The layers 10, 11 are components of a two-layer winding 12 of the stator 1. In the example shown, the two-layer winding 12 includes six electrical coils, each of which is produced by interconnecting a respective subset of the conductor elements 6, 7. In each case, one conductor element of the outer layer 10 and one conductor element of the inner layer 11 form a phase terminal or coil terminal 13 of one of the coils. The coil terminals 13 of a coil are in each case arranged in an interconnecting region 14.

Figure 2:
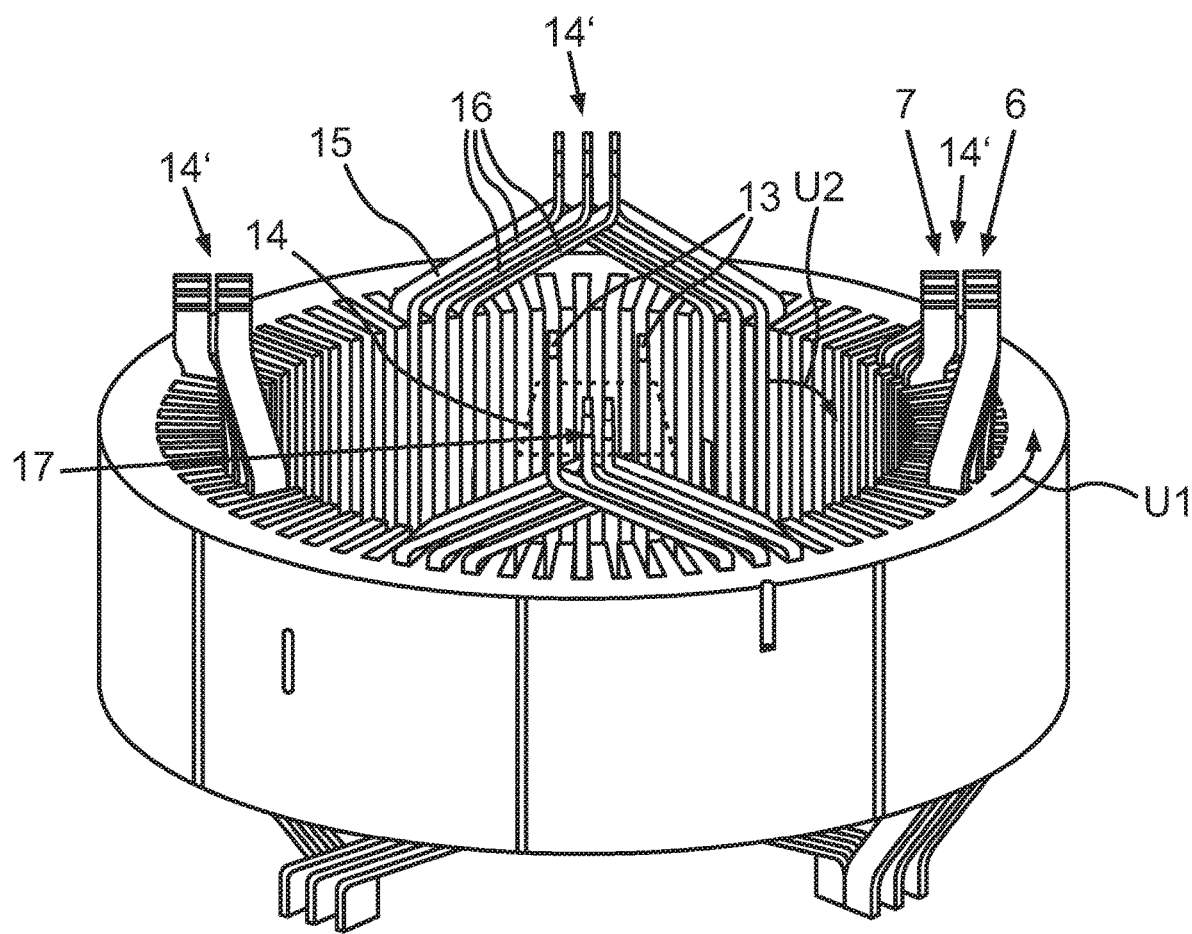
FIG. 2 shows a schematic representation of an individual electrical coil of the stator from FIG. 1.

FIG. 2 shows, for the purpose of illustration, a single electrical coil 15. The representation in FIG. 2 corresponds to the representation in FIG. 1, while all those conductor elements 6, 7 that are associated with the other electrical coils are omitted. The coil 15 represented in FIG. 2 has altogether three loops or turns 16, which are electrically interconnected with one another within the interconnecting region 14 by an interconnection of turns 17.

To form the turns 16 of the coil 15, the conductor elements 6 of the outer layer 11 have been skewed or bent along a circumferential direction U1, while the conductor elements 7 of the inner layer 11 have been bent in an opposite circumferential direction U2. As a result, the conductor elements 6, 7 of the two layers 10, 11 are transposed with one another.

For forming the coil terminals 13 and the interconnection of turns 17, the conductor elements 6, 7 must be selectively shaped in the interconnecting region 14 in a special way. The interconnections of the conductor elements 6, 7 outside the interconnecting region 14 together represent a normal region 14', in which no selective shaping is necessary.

Figure 3:
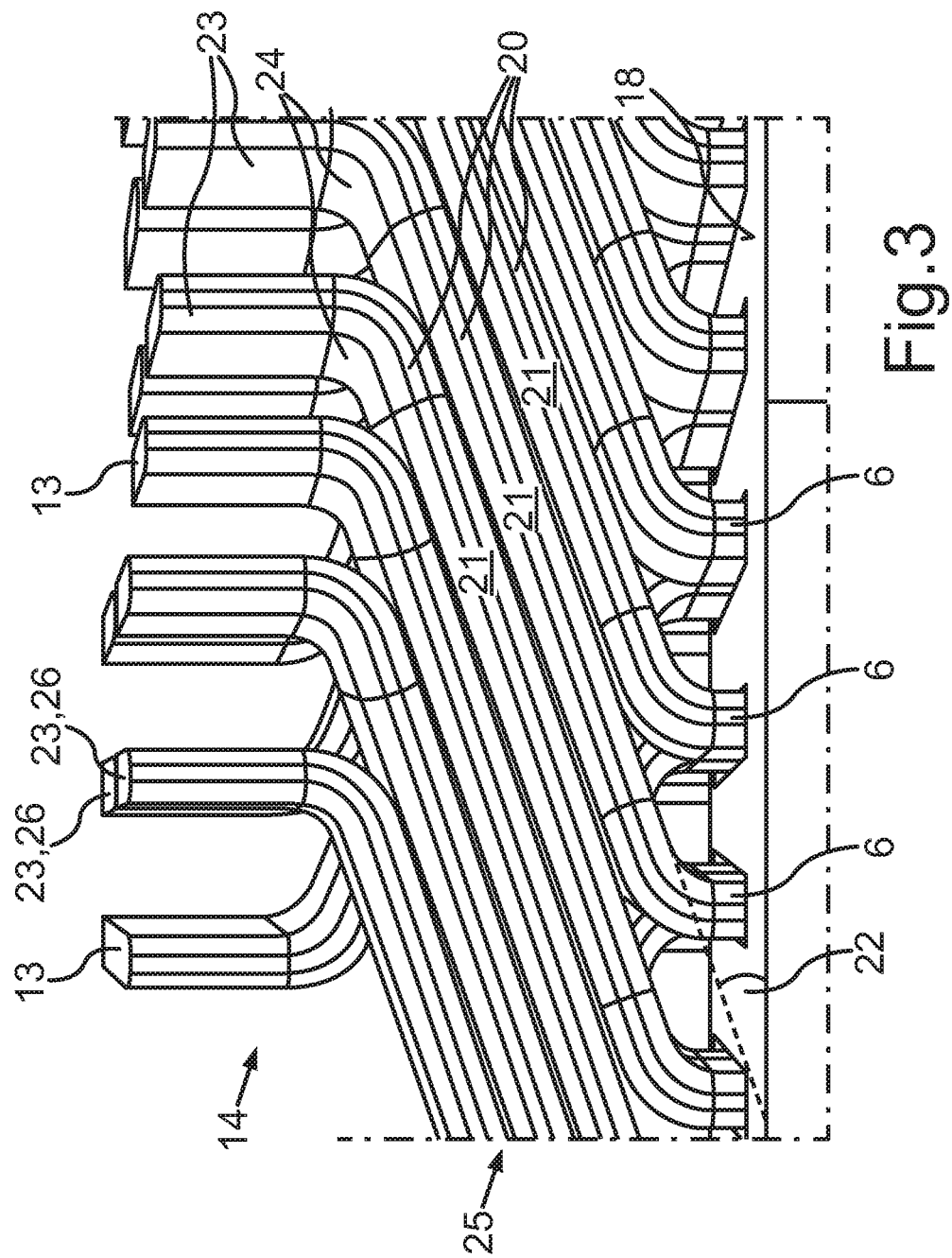
FIG. 3 shows a schematic representation of a perspective view of an interconnecting region of turns of the coil from FIG. 2 and also electrical terminals of the coil.
Figure 4:
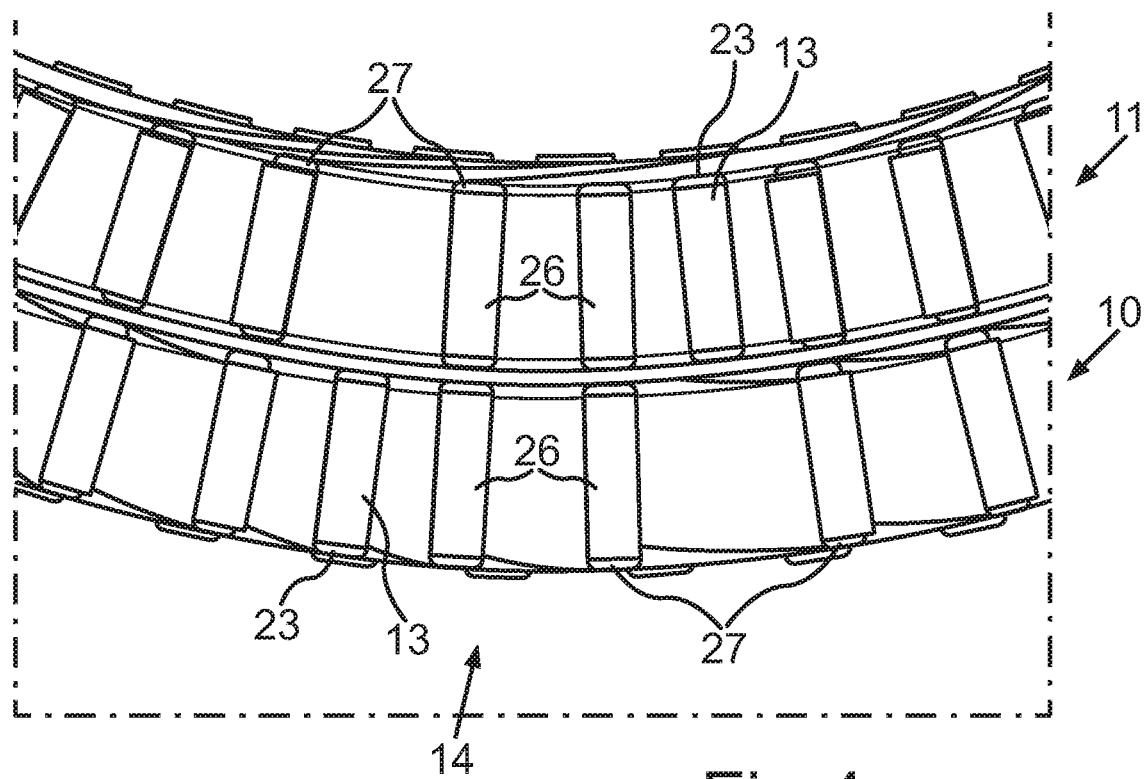
FIG. 4 shows a schematic representation of the interconnecting region from FIG. 3 in a plan view.

The interconnecting region 14 is represented once again in an enlarged form in FIG. 3 and FIG. 4.

In FIG. 3 it is shown how, for forming the coil 15 and the other coils of the electrical conductor elements 6, 7, the pin ends or conductor pieces 20 that project from an end face 18 at one axial end 19 of the laminated core 2 have, in each case, been skewed or bent, so that a skewing region 21 has a skewing angle 22 with respect to the end face 18.

The conductor pieces 20 also have conductor ends 23, which are aligned parallel to the axis 9. The conductor pieces 20 have for this purpose a cranked offset 24.

The skewing angles 22 of all the skewing regions 21 of the conductor pieces 20 are the same. As a result, the conductor pieces 20 lie particularly closely one on top of the other. The conductor pieces 20 are part of an end winding 25 at the end face 18 of the laminated core 2.

In the interconnecting region 14, a conductor end 23 of the outer layer 10 and a conductor end 23 of the inner layer 11 are respectively arranged axially in line in pairs and electrically interconnected with one another. The electrical interconnection may have been performed for example by welding or soldering the conductor ends 23. The turns 16 are interconnected with one another in the interconnecting region 14 by way of the conductor ends 23. The conductor ends 23 in the interconnecting region 14 are therefore referred to hereinafter as interconnecting ends 26. The coil terminals 13 are formed in each case by a conductor end 23, which is arranged between two adjacent conductor ends 27 of the other layer 10, 11 respectively.

Outside the interconnecting regions 14 in the normal region 14', the conductor ends 23 are arranged at uniform angular spacings from one another. By contrast, in the interconnecting regions 14, it is necessary to vary the angular spacings of the conductor ends 23, as shown in FIG. 4, in order to form on the one hand the coil terminals 13 and on the other hand the interconnecting ends 26.

In order to form the end winding 25 on the stator 1, the conductor elements 6, 7 have been deformed in such a way that the skewing regions 21 and the cranked offset 24 are obtained and the conductor ends 23 are arranged in the described relative positions in relation to one another, so that the conductor ends 23 in the normal region 14' have regular or uniform angular spacings from one another and in the interconnecting region 14 the conductor ends 23 are formed into the coil terminals 13 and the interconnecting ends 26.

Figure 5:
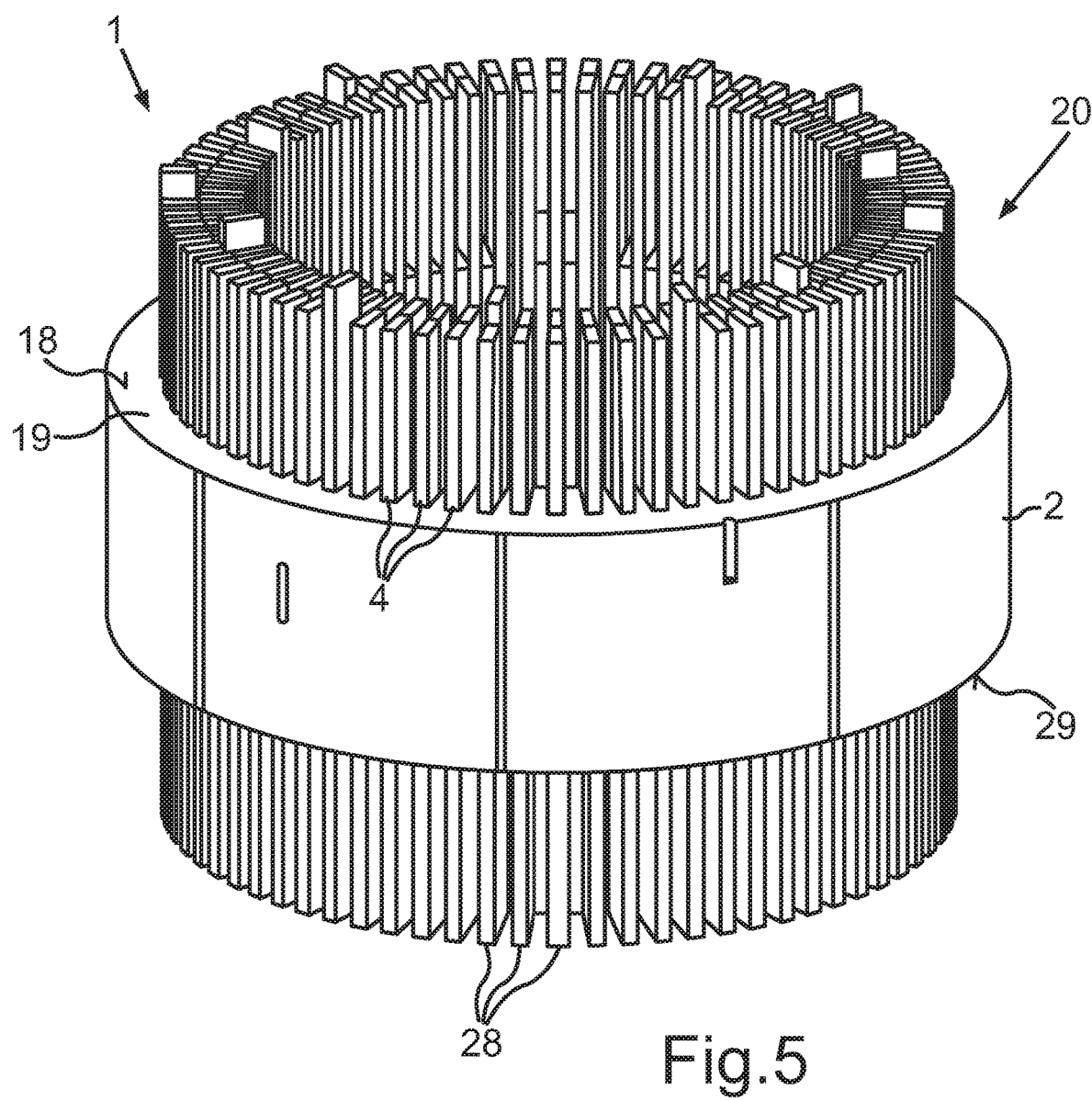
FIG. 5 shows a schematic representation of a perspective view of the stator from FIG. 1 at the beginning of its production, a perspective having been turned with respect to FIG. 1.

In FIG. 5 it is shown how, at the beginning of the production of the stator 1, the conductor elements 6, 7 have, in each case, been inserted into the slots 4 as straight bars 28. Here, the bars 28 may be of the same axial length. As shown in FIG. 5, it may however also be provided that the conductor bars that are intended to provide coil terminals 13 are longer than the other conductor elements. Furthermore, it should be noted that the described interconnecting regions 14 are only to be provided on one end face 18. On an opposite end face 29, all of the conductor elements may be formed uniformly, i.e. only a normal region is to be provided there. In the case of the hairpin technique, there the conductor elements have already been electrically connected by the U shape of the wires.

The bars 28 may have been inserted into the slots 4 along the axial direction 3. As a result, an insert winding of the electrical coils of the stator 1 is obtained.

Starting from the stator 1 in the state in which it is shown in FIG. 5, the end winding 25 is formed by performing a forming operation on the conductor pieces 20 that protrude out of the end face 18.

For this purpose, first a positioning process takes place, in which all of the conductor elements 6 of the layer 10 are brought into a relative end position in relation to one another that they also have in the case of the finished stator 1 according to FIG. 1. Similarly, the conductor ends 23 of the conductor elements 7 of the inner layer 11 are for their part brought into a relative end position that they also have in the case of the finished stator 1 according to FIG. 1.

Figure 6:
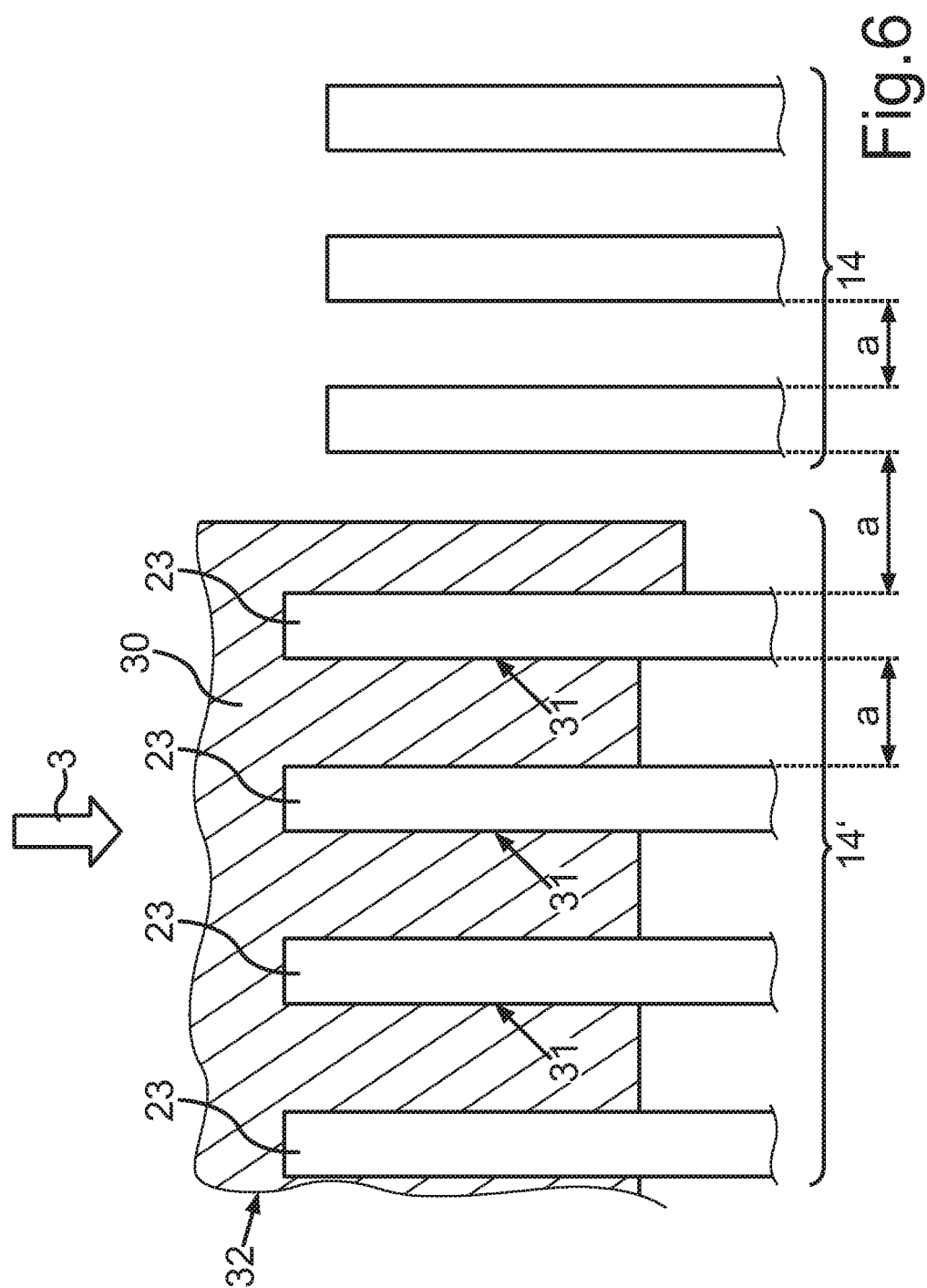
FIG. 6 shows a schematic representation of a normal skewing tool when it is being brought together with conductor ends of electrical conductor elements of the stator.

FIG. 6 shows how for this purpose, in a first step of the positioning process, a normal skewing tool 30 on the one hand and conductor ends 23 of the conductor elements of the normal region 14' on the other hand are fitted together by the conductor ends 23 and the normal skewing tool 30 being fitted together and, as a result, the conductor ends 23 being inserted into receiving regions or pockets 31 of the normal skewing tool 30 or arranged in the pockets 31. The pockets 31 may be designed, for example, as a blind hole of a body 32 of the normal skewing tool 30. In FIG. 6 it is shown that all of the conductor ends have along the circumferential direction the same spacing a, which is predetermined by the arrangement of the slots 4 in the laminated core 2.

Figure 7:
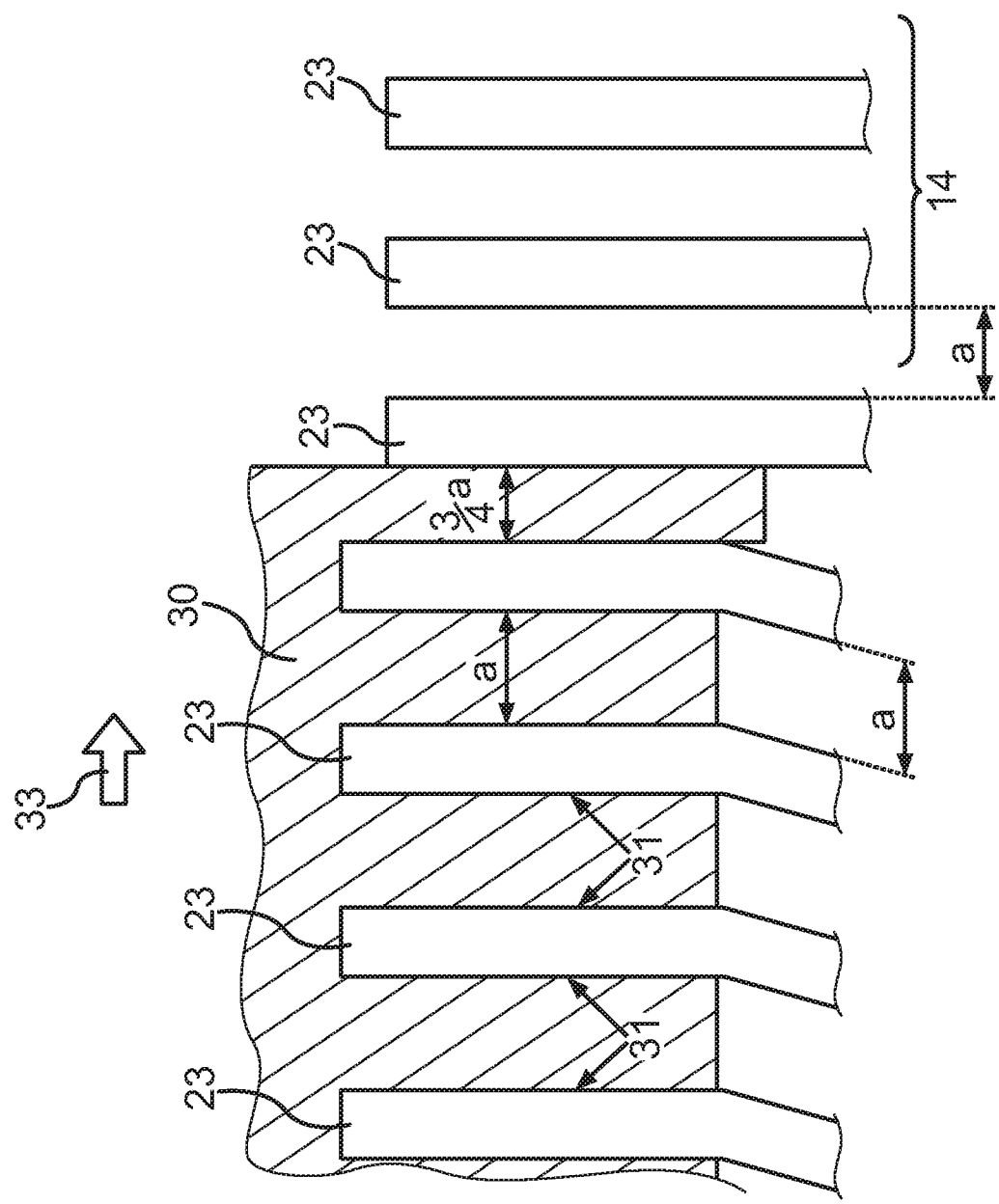
FIG. 7 shows a schematic representation of the normal skewing tool from FIG. 6 during a movement in the circumferential direction.

FIG. 7 shows how subsequently the normal skewing tool 30 with the conductor ends 23 arranged in the pockets 31 is turned by a relative rotation of the stator 1 and of the normal skewing tool 30 in a rotation 33 about a predetermined turning angle in the circumferential direction, along the circumferential direction U1 in the case of the outer layer 10. In the case of the layer 11, the rotation 33 takes place in the opposite circumferential direction U2. In FIG. 7, dimensions of the normal skewing tool 30 and of a selective skewing tool 34 are illustrated in relation to the spacing a of the conductor ends at the slots 4.

Figure 8:
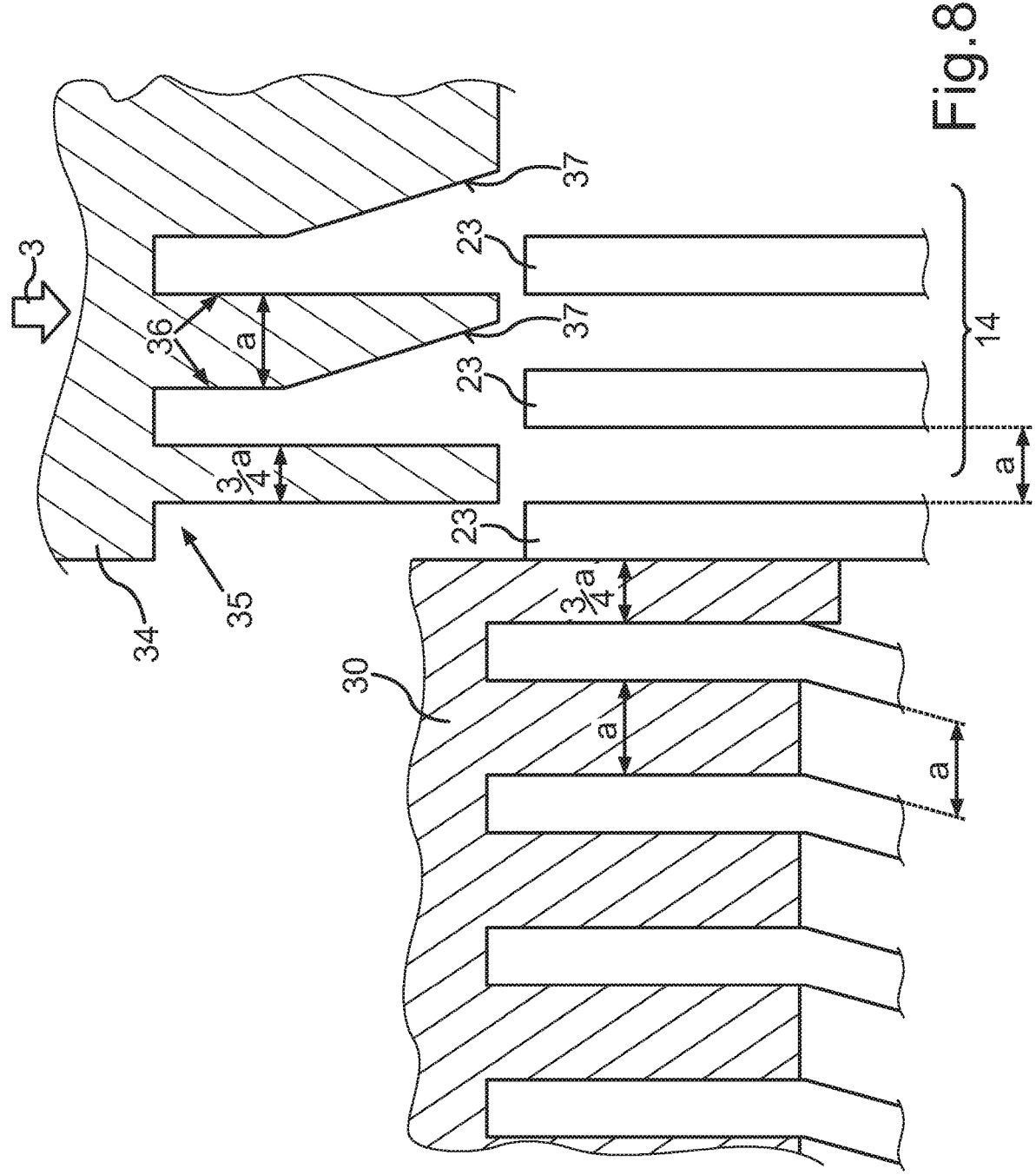
FIG. 8 shows a schematic representation of a selective skewing tool when it is being brought together with the conductor ends.

FIG. 8 shows how subsequently the selective skewing tool 34 and the conductor ends 23 of the interconnecting region 14 are fitted together. The selective skewing tool 34 likewise has pockets 35, 36, into which one of the conductor ends 23 is respectively arranged by the selective skewing tool 34 and the conductor ends 23 being fitted together in the axial direction 3. Here, some pockets 36 have a sloping pocket wall 37 with respect to the axial direction 3.

Figure 9:
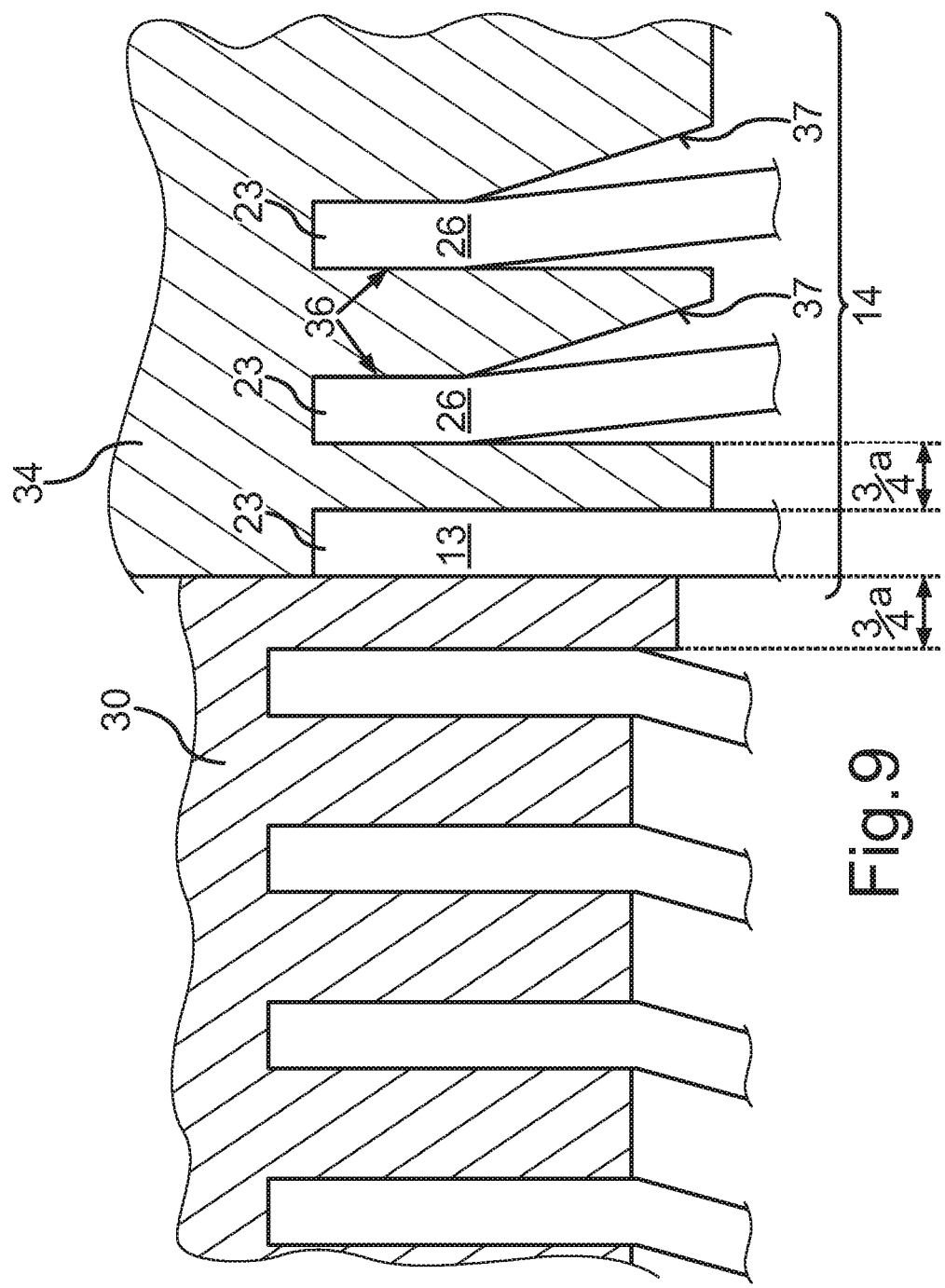
FIG. 9 shows a schematic representation of the normal skewing tool and the selective skewing tool at the beginning of a twisting process.

FIG. 9 shows how, after the fitting together of the selective skewing tool 34 and the conductor ends 23, as a result of the sloping pocket wall 37 the conductor ends 23 that are arranged in the pockets 36 have been moved in the circumferential direction in such a way that the conductor ends 23 in the interconnecting region 14 have been moved relatively in relation to one another. This produces a conductor end 23 for the coil terminal 13 and interconnecting ends 26.

After the fitting together of the conductor ends 23 and the normal skewing tool 30 and also the selective skewing tool 34, the positioning process is ended, and the conductor ends 23 of all the conductor elements 6, 7 are in their relative end position.

Figure 10:
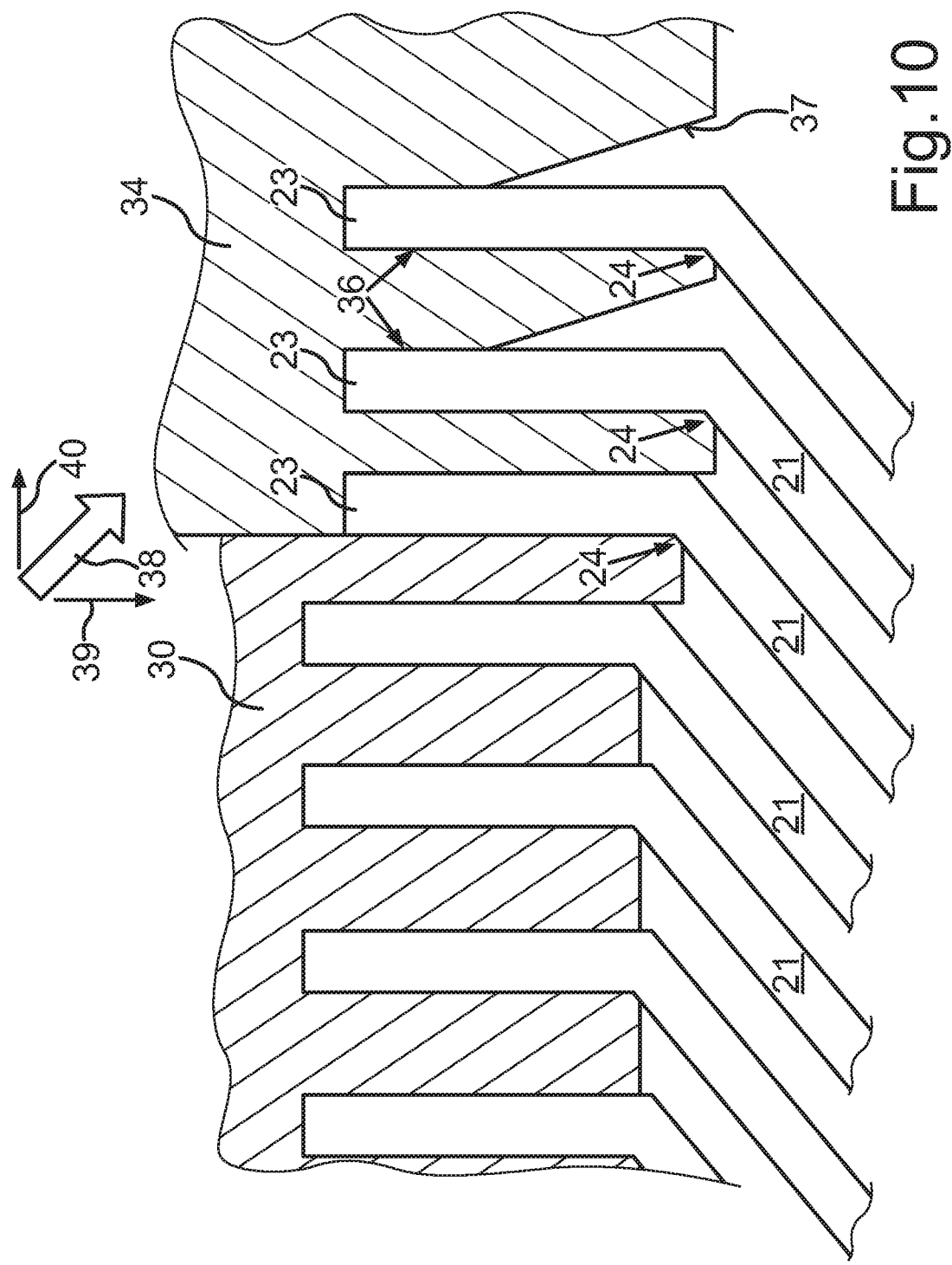
FIG. 10 shows a schematic representation of the normal skewing tool and the selective skewing tool during the twisting process.

FIG. 10 shows how in a subsequent twisting process both the normal skewing tool 30 and the selective skewing tool 34 perform a joint twisting movement 38 with respect to the laminated core 2. As a result, the cranked offsets 24 and the skewing regions 21 are formed. The twisting movement 38 is made up of an axial movement 39 and a rotation 40 along the circumferential direction. For the outer layer 10, this is the circumferential direction U1, for the inner layer 11 it is the circumferential direction U2. By the axial movement 39, the tools 30, 34 on the one hand and the laminated core 2 on the other hand are brought together.

Figure 11:
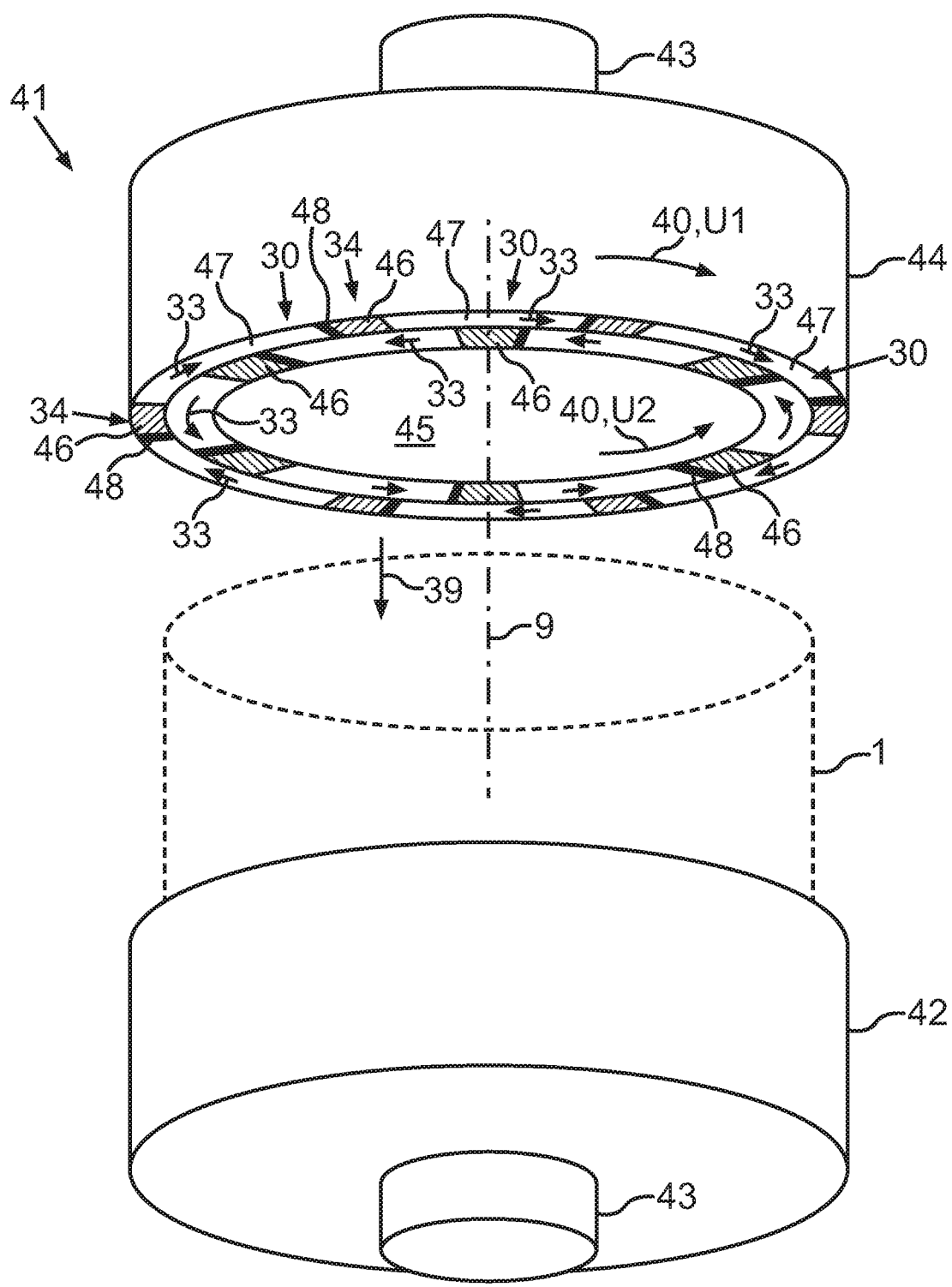
FIG. 11 shows a schematic representation of an example of the tool arrangement according to the disclosure with the normal skewing tool and the selective skewing tool for two layers of a two-layer winding.

FIG. 11 shows a tool arrangement 41, by means of which the positioning process (FIG. 6 to FIG. 9) and the twisting process (FIG. 10) can be carried out. The tool arrangement 41 may have a holding device 42 for the stator 1, a movement device 43 for carrying out the described movements and a tool region 44 for the outer ring and a tool region 45 for the inner ring.

The holding device 42 may have mechanical holding elements. The movement device 43 may have at least one electric motor and/or a hydraulic unit.

Each tool region 44, 45 may respectively have for each of the coils a tool part 46, by which the selective skewing tool 34 is formed altogether for the tool regions 44, 45. Further tool parts 47 together form the normal skewing tool 30. For the sake of clarity, the pockets of the tools 30, 34 are not represented in FIG. 11. The tool parts 46, 47 are in each case spaced apart from one another by a space or a gap 48 and can be moved independently of one another by the movement device 43, in order thereby first to perform the rotation 33 with the normal skewing tool 30, as described in FIG. 6 and FIG. 7.

The stator 1 in the state shown in FIG. 5, with the bars 28, can be arranged in the holding device 42. By the movement device 43, the tool regions 44 and 45 are then arranged on the conductor ends 23 by the positioning process and the end winding 25 is subsequently formed by the twisting process in one operation. After that, the conductor ends 23 that are then arranged axially in line can be electrically connected to one another by for example being welded or soldered. It is possible to use a laser welding method for this.

After that, the coil 15 and the other coils are provided in the stator 1.

For the opposite end face 29, there can be provided a simpler tool, which only performs the twisting process, in which all of the conductor ends 23 at the end face 29 are turned by the same turning angle in the circumferential directions U1, U2, and the conductor pieces at the end face 29 are thereby transposed with one another uniformly.

By the tool arrangement 41 and the process sequence of the positioning process and the twisting process, on the stator 1 the conductor pieces 20 protruding out from the end face 18 are transposed. Special features here are the selective twisting for forming the interconnecting regions 14 with at the same time a compact or small end winding height, since all of the skewing regions 21 of the conductor pieces 20 have the same bending angle or skewing angle 22 with respect to the end face 18. By the selective twisting, that is to say the different treatment of the conductor ends 23 in the normal region 14' and in the interconnecting region 14, the conductor ends 23 are already in their relative end position before the twisting process is begun. Within the interconnecting regions 14, the relative end position of the conductor ends 23 is already brought about also within each interconnecting region 14 by lead-in slopes that are formed by the sloping pocket walls 37.

During the positioning process and subsequent twisting process, the conductor ends 23 in the interconnecting region are transposed by a certain amount less than the conductor ends 23 in the normal region 14'. This is referred to as negative selective twist. If the conductor ends 23 in the interconnecting region are transposed more by the certain amount, on the other hand, a positive twist is obtained. The transposition process serves generally for the forming of coils in the laminated core 2 of the stator. The selective twist provides the possibility of interconnecting the end winding in different ways, by, in each case, fixing the relative end position of the conductor ends 23 in the interconnecting region 14.

Generally, the following description of the process is obtained. The conductor ends 23 of the conductor elements 6, 7 of each layer 10, 11 are received axially in the tool regions 44, 45, in the pockets arranged there. The fixing of the conductor ends 23 in the pockets takes place during the twisting process by passive clamping. This is ensured by correspondingly little play between the conductor ends 23 and the pockets. Then, for the twisting process, the tool regions 44, 45 are rotated oppositely for the inner and outer layers 10, 11, and thereby transpose all of the conductor ends 23 uniformly by an identical turning angle along the circumferential direction.

The described design of the pockets has the effect that, before the actual twisting process, the conductor ends 23 are already in final positions of being relatively aligned in relation to one another. In order to achieve the effect that the conductor ends 23 are already in their final relative alignment in relation to one another before the twisting process is carried out by the tool arrangement 41, the conductor ends 23 must be received in the pockets of the tool regions 44 or 45 in two different process steps. The sequence of the forming operation is then as follows, while movements that are necessary because of bracing and springing back have not been described here.

The receiving of the conductor ends 23 for the normal region 14' takes place by axially moving the normal skewing tool 30. Then, a positioning of the conductor ends 23 of the normal region 14' in the twisting direction of rotation takes place by radially moving the normal skewing tool 30 by half the turning angle of the selective twist. Subsequently, the positioning of the conductor ends 23 for the interconnecting region 14 by half the turning angle of the selective twist takes place by axially moving the selective skewing tool 34 with the lead-in slopes of the sloping pocket walls 37. Finally, the actual twisting process for forming the end winding 25 then takes place.

Altogether, the example shows how a tool variant for selective twisting when transposing pin ends in the production of motor windings can be provided by the disclosure.

A number of implementations have been described. Nevertheless, it will be understood that various modifications may be made without departing from the spirit and scope of the disclosure. Accordingly, other implementations are within the scope of the following claims.

What is claimed is:

1. A method for producing a stator, the method comprising the steps of:
   providing a two-layer winding having a radially outer layer and a radially inner layer;
   providing plurality of electrical conductor elements, a portion of the plurality of electrical conductor elements being part of the radially outer layer, and a portion of the plurality of electrical conductor elements being part of the radially inner layer;
   providing a plurality of axial conductor ends, one or more of the plurality of axial conductor ends being part of a corresponding one of the plurality of electrical conductor elements;
   providing a laminated core having an end face and a plurality of slots;
   providing a normal skewing tool;
   providing a selective skewing tool;
   providing a normal region;
   providing a connection region;
   providing a plurality of pockets being part of the selective skewing tool, each of the plurality of pockets receiving a corresponding one of the plurality of axial conductor ends of one of the plurality of axial conductor elements located in the connecting region;
   providing a plurality of sloping pocket walls, each one of the plurality of sloping pocket walls being part of one of the corresponding plurality of pockets;
   arranging each of the plurality of electrical conductor elements in one or more of the slots such that a portion of the plurality of axial conductor ends are located in the normal region, and a portion of the plurality of axial conductor ends are located in the connecting region; and
   providing a positioning process for one of the radially outer layer or the radially inner layer, the positioning process further comprising the steps of:
      axially fitting the normal skewing tool with the plurality of axial conductor ends in the normal region;
      turning the normal skewing tool with respect to the laminated core such that the plurality of axial conductor ends in the normal region are moved relative to one another;
      axially fitting together the selective skewing tool with the plurality of axial conductor ends in the connecting region, such that the plurality of axial conductor ends the interconnecting region are in a relative end position in relation to one another and are intended for an interconnection of some of the conductor ends with corresponding conductor ends of the other of the radially outer layer or the radially inner layer;
      moving the plurality of axial conductor ends with one or more of the pocket walls during the axially fitting together of the selective skewing tool with the plurality of axial conductor ends in the connecting region along a circumferential direction such that the plurality of axial conductor ends in the connecting region are moved in relation to one another.

2. The method of claim 1, the positioning process further comprising the steps of:
   moving the plurality of electrical conductor ends of the normal region in a first circumferential direction by a predetermined first turning angle; and
   moving the plurality of electrical conductor ends of the interconnecting region in a second circumferential direction by a respective turning angle that is smaller than the first turning angle.

3. The method of claim 1, further comprising the steps of:
   arranging the plurality of electrical conductor elements in the slots such that each of the plurality of electrical conductor elements of both the radial outer layer and the radial inner layer protrude axially out of the end face as a straight conductor piece;
   after the positioning process, jointly bending each straight conductor piece in a twisting process by relatively turning and axially bringing together the normal skewing tool and the selective skewing tool on and the laminated core, forming a skewing region of each straight conductor piece which has the same skewing angle with respect to the end face.

4. The method of claim 3, the twisting process further comprising the steps of:
   bending each conductor piece of the outer layer in one circumferential direction; and
   bending each conductor piece of the inner layer in an opposite circumferential direction, each conductor piece of the outer layer and each conductive piece of the inner layer is arranged transposed in relation to one another.

5. The method of claim 3, the twisting process further comprising the steps of: radially arranging the plurality of axial conductor ends of one of the radially outer layer (10) or the radially inner layer (11) moved by the normal skewing tool in line with the corresponding plurality of axial conductor ends of the other of the radially outer layer (10) or the radially inner layer.

6. The method of claim 3, further comprising the steps of after the twisting process, only some of the conductor ends of one of the layers that are moved by the selective skewing tool are arranged radially in line with corresponding conductor ends of the other layer and, for each intended electrical coil of the stator, a conductor end of the conductor elements of the interconnecting region for each layer is respectively arranged between two adjacent conductor ends of the other layer.

7. The method of claim 3, further comprising the steps of:
   the positioning process further comprises arranging the plurality of axial conductor ends in a pocket of one of the normal skewing tool or the selective skewing tool; and
   the twisting process further comprising the steps of cranking each of the plurality of electrical conductor elements between the skewing region and the plurality of axial conductor ends, so that each of the plurality of axial conductor ends remains aligned axially.

8. The method of claim 1, further comprising the steps of:
   providing each of the plurality of axial conductor elements to be straight bars or U-shaped wires for respectively arranging them in one of the plurality of slots;
   inserting the plurality of axial conductor elements into a corresponding axial end of the plurality of slots;
   pushing the plurality of axial conductor elements into the plurality of slots in the axial direction.

9. The method of claim 1, further comprising:
   a plurality of slots formed as part of the laminated core;
   a plurality of radially inner slot openings, each of the plurality of radially inner slot openings integrally formed as part of a corresponding one of the plurality of slots;
   wherein each of the plurality of radially inner slot openings have in the circumferential direction a slot width which is less than a dimension of each of the plurality of conductor elements that are respectively arranged in the plurality of slots.

10. A tool arrangement for producing a stator for an electrical machine, the tool arrangement comprising:
- a normal skewing tool with respective pockets for receiving a conductor end of one or more of a plurality of conductor elements;
- a selective skewing tool with respective pockets for receiving a conductor end of one of the plurality of the conductor elements;
- a holding device for holding a laminated core in such a way that an end face of the laminated core is facing the normal skewing tool and the selective skewing tool; and
- a movement device, the laminated core is arranged in the holding device and loaded with the plurality of conductor elements, each conductor end of a corresponding one of the plurality of conductor elements is arranged in one of the pockets of the normal skewing tool or one of the pockets of the selective skewing too in a positioning process;
- one or more of the respective pockets of the selective skewing tool further comprising:
  - a sloping pocket wall arranged sloping with respect to the axial direction;
  - a sliding surface formed as part of the sloping pocket wall, the sliding surface pushes away the respective conductor end along a circumferential direction;
- wherein during the positioning process the first the normal skewing tool is moved by the movement device along an axial direction up to the end face, and then turned in a circumferential direction with respect to the end face, and then the selective skewing tool is moved by the movement device along the axial direction up to the end face.

11. The tool arrangement of claim 10, wherein, after the positioning process, the normal skewing tool and the selective skewing tool on and the laminated core are brought together in a twisting process and, during the twisting process the normal skewing tool and the selective skewing tool are turned jointly in relation to the laminated core, so that the plurality of conductor elements are uniformly bent by the same skewing angle with respect to the end face.

* * * * *